Aug. 5, 1947.  V. H. VAN SANT  2,425,015
GRID WINDING MACHINE
Filed Oct. 27, 1942  9 Sheets-Sheet 6
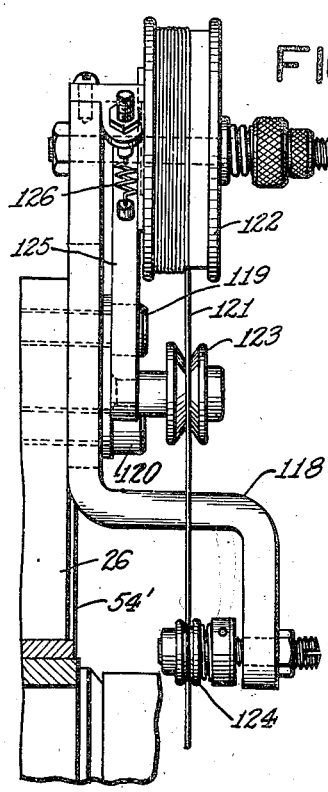
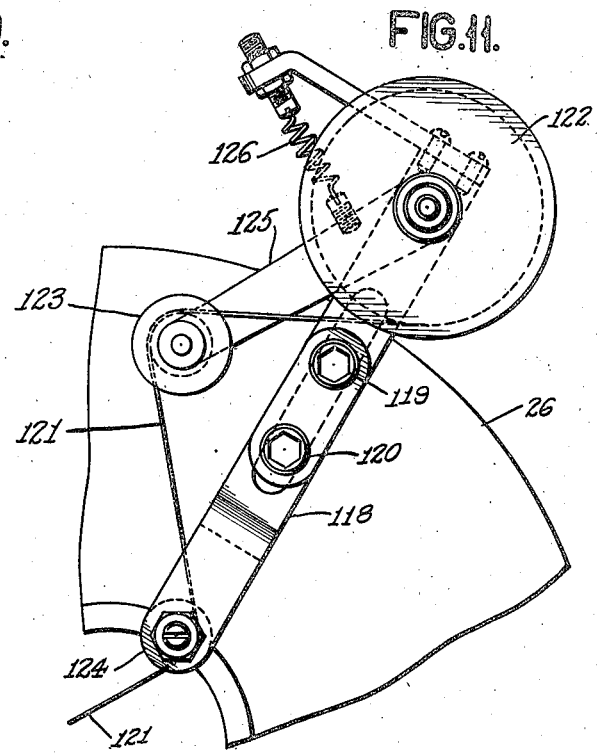
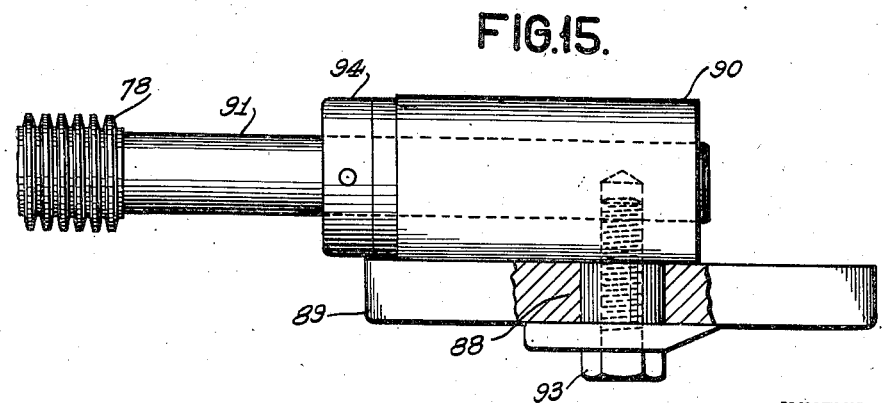
INVENTOR.
Victor H. Van Sant
BY James N. Curtin
ATTORNEY

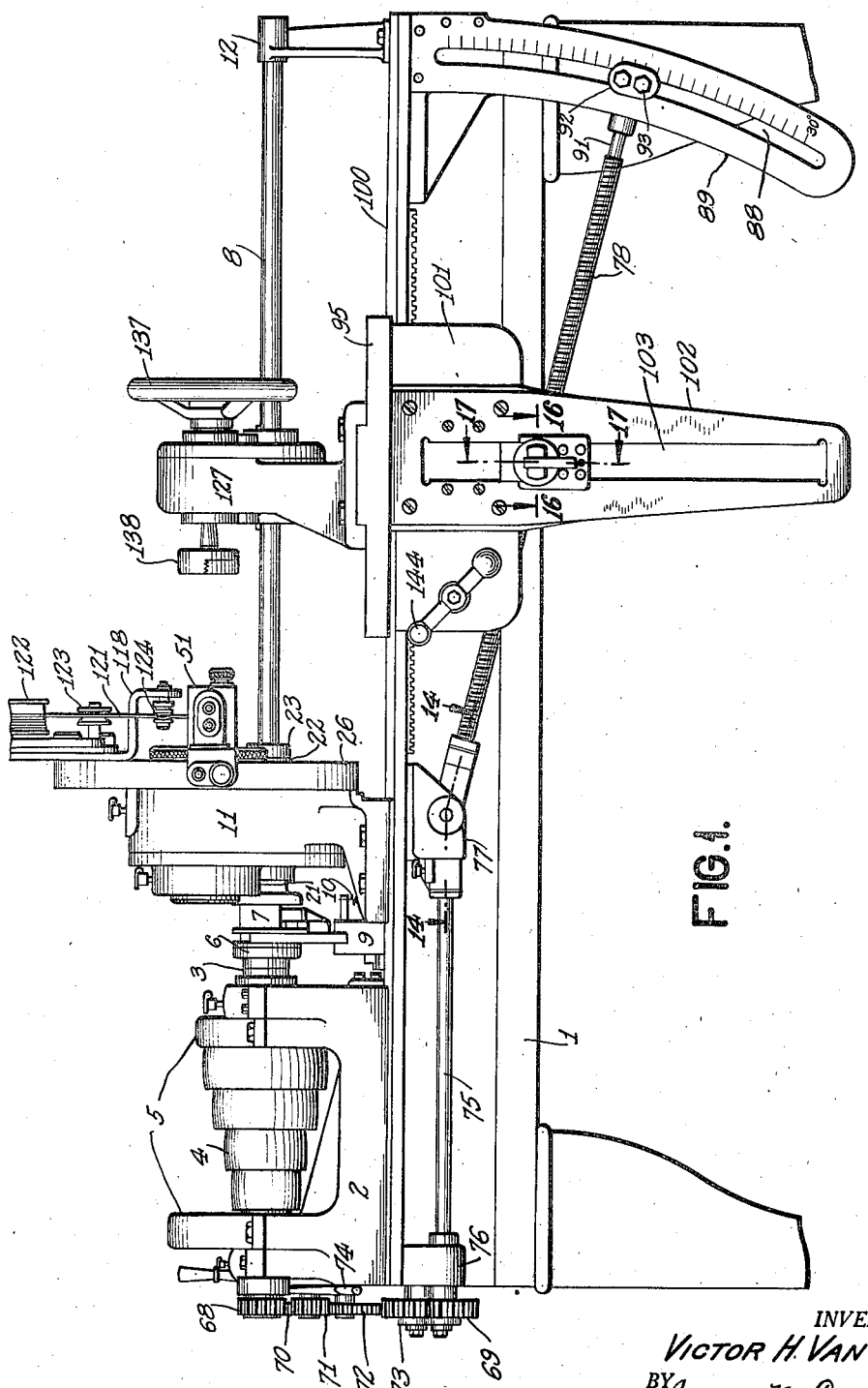

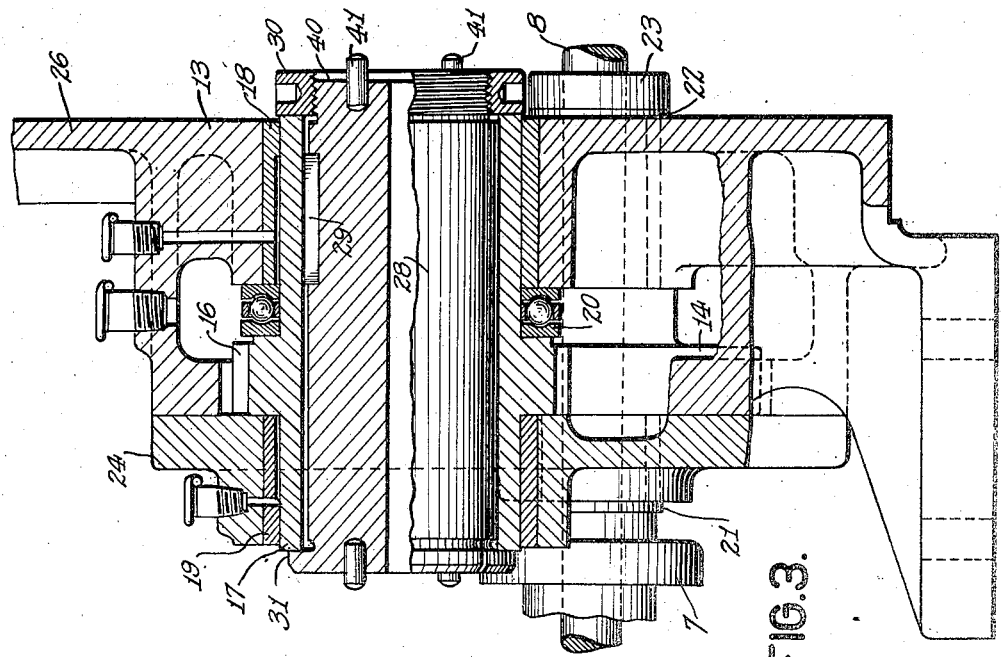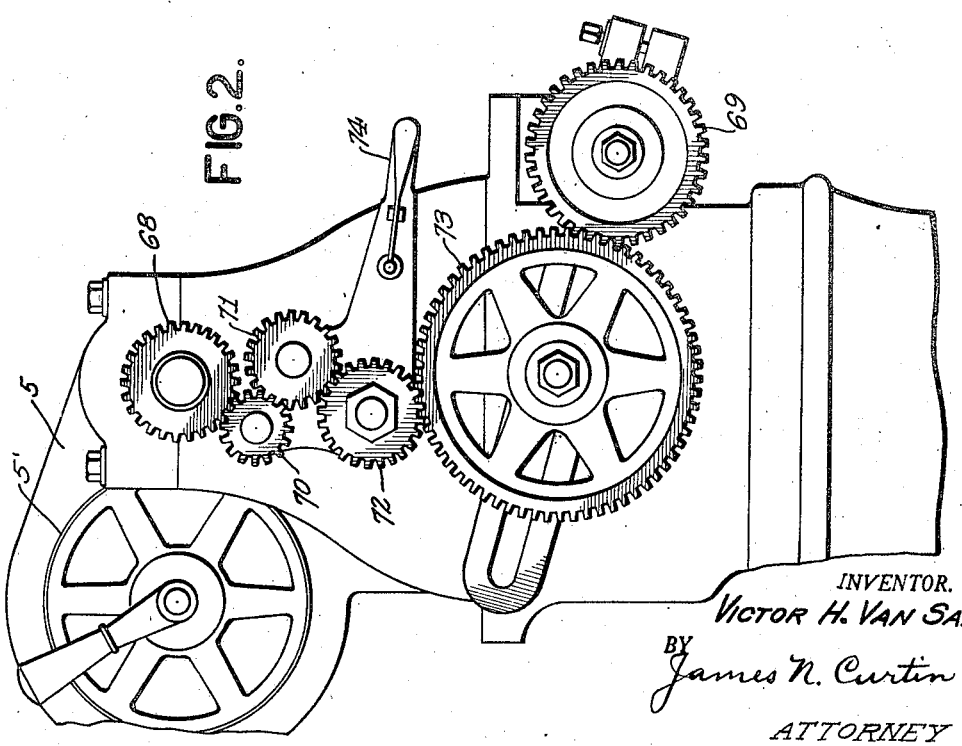

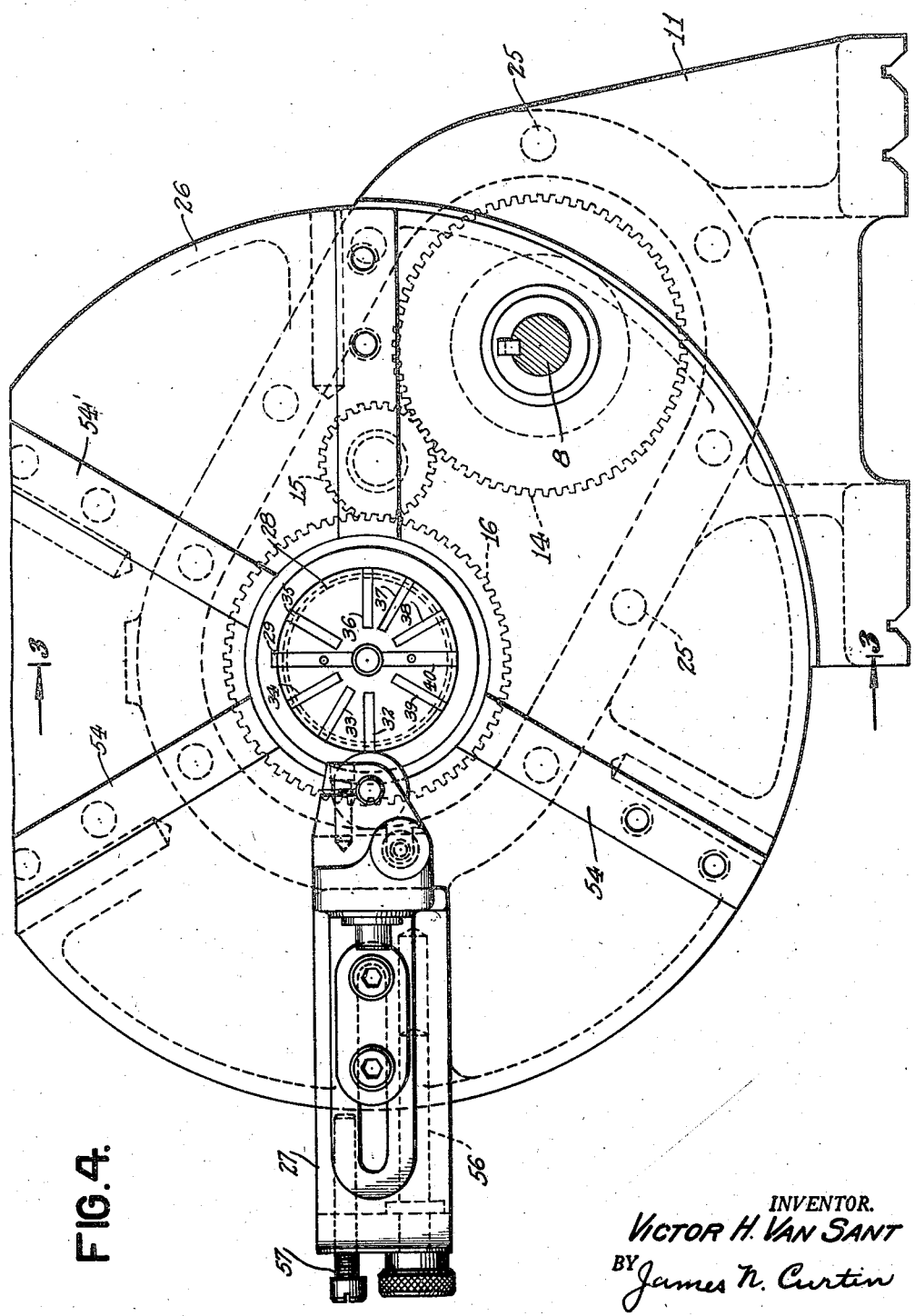

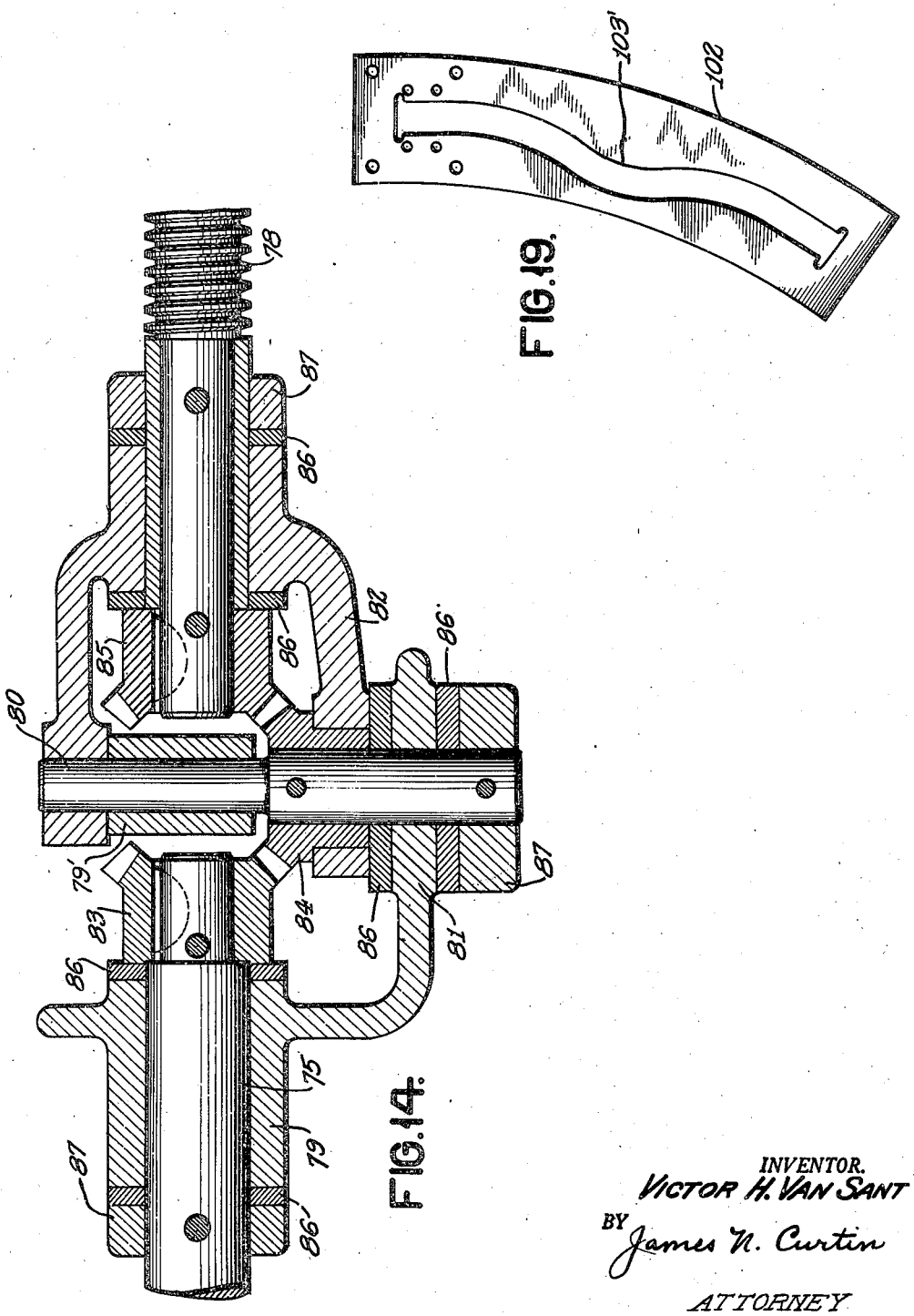

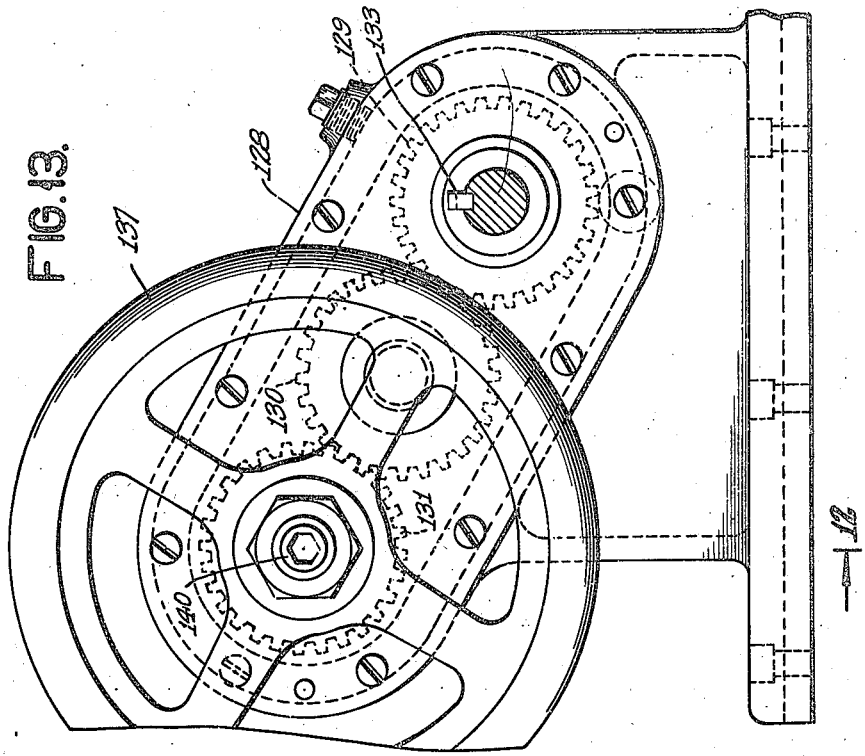
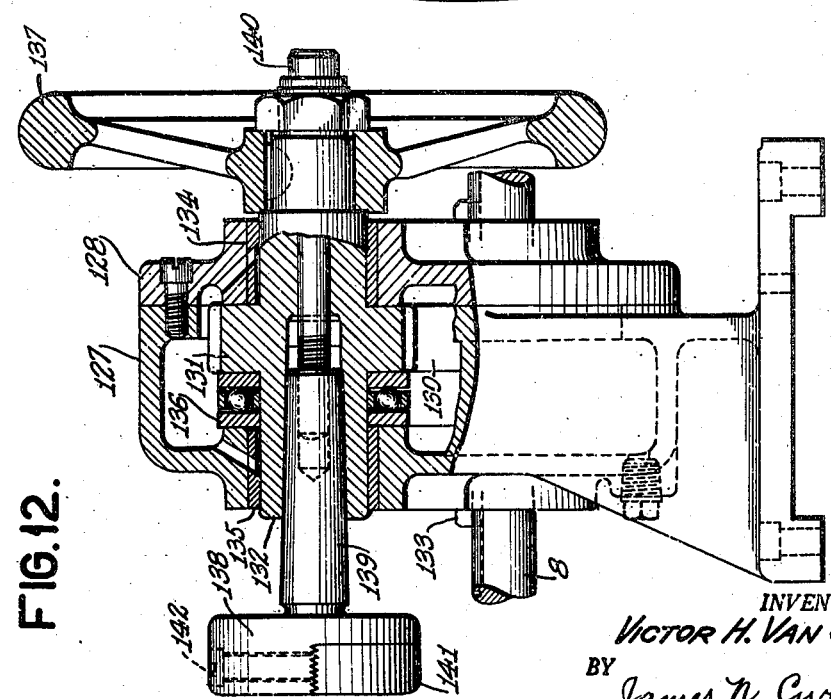

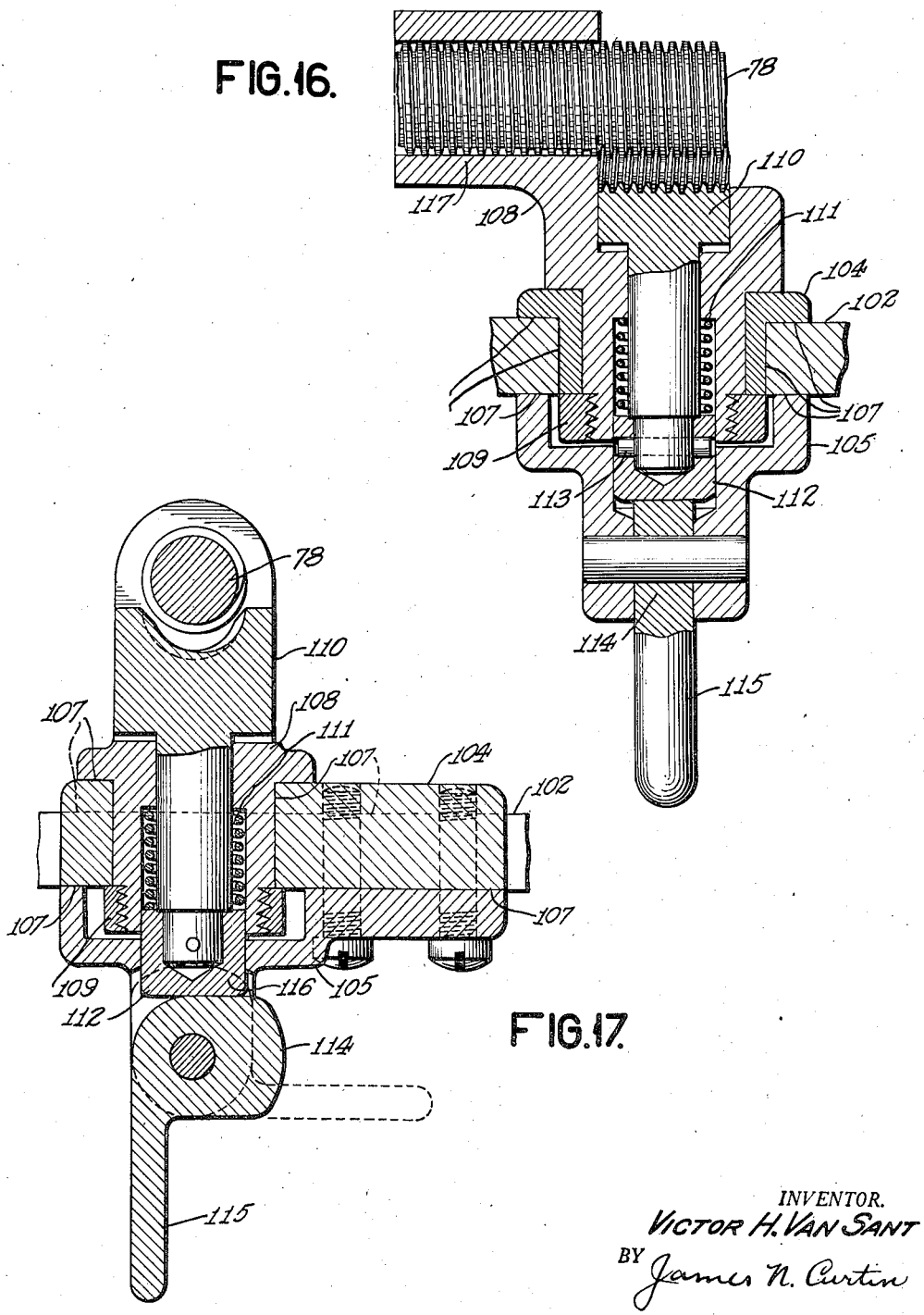

Aug. 5, 1947.  V. H. VAN SANT  2,425,015
GRID WINDING MACHINE
Filed Oct. 27, 1942  9 Sheets—Sheet 9

INVENTOR.
VICTOR H. VAN SANT
BY James N. Curtin
ATTORNEY

Patented Aug. 5, 1947

2,425,015

UNITED STATES PATENT OFFICE 2,425,015

GRID WINDING MACHINE

Victor H. Van Sant, Westfield, N. J., assignor to Federal Telephone & Radio Corporation, New York, N. Y., a corporation of Delaware Application October 27, 1942, Serial No. 463,569

12 Claims. (Cl. 153—64)

This invention relates to machine tools and in particular to a machine for automatically constructing grid electrodes for electronic vacuum tubes. It also relates to machines for winding coils or springs and in general to any machine tool which combines a rotational and a rectilinear motion as, for example, a screw cutting lathe or mill.

In machines or machine tools of these types there is usually a gear train located between the rotating element or spindle and the element for producing rectilinear motion, the latter commonly taking the form of a lead screw and an associated traveling half nut. The gears of the train are interchangeable in order that various ratios may be obtained between the rotation of the spindle with respect to the rotation of the lead screw. However, regardless of the number of change gears which may be provided there will always be some ratios which are not obtainable since the ratios change abruptly from one value to another depending on the number of teeth in the gears of the train, and obviously there cannot be a fractional number of teeth. In actual practice, change gears are so chosen that some particular ratio is obtained to suit the type of work to be done. For example, if the machine tool be a screw cutting lathe, gears are chosen which will permit the lathe to cut screws having any number of standard threads per inch. Some lathes are provided with so called transposing gears. When these gears are included in the gear train, metric threads may be cut on a lathe having an English lead screw and English threads may be cut on a lathe having a metric lead screw. This is possible since the number of centimeters per inch is for all practical purposes the decimal 2.54, a number which may be expressed by the relative simple fraction $127/50$.

However, occasions frequently arise wherein it would be desirable to obtain a relation between spindle rotation and lead screw advance other than would normally be available. One such example would be in the cutting of diametral pitch worm gears. The number of threads per unit length of these gears involves the factor $\pi$ the ratio between the circumference and the diameter of a circle, and this factor is incommensurable with any whole or fractional number of turns per inch or per centimeter such as might appear on standard lead screws.

In accordance with my invention I provide a mechanism whereby a lead screw having English or metric threads, may be inclined at an angle with the normal direction of rectilinear motion. When the traveling half nut traverses the lead screw unit distance, the corresponding distance in the direction of rectilinear motion is equal to this unit distance times the cosine of the angle of lead screw inclination. It is thus possible to obtain any desired relation between the rate of spindle rotation and the rate of normal rectilinear motion.

It is therefore, the primary object of my invention to provide a positive mechanism which, when applied to any machine incorporating a rotational with a rectilinear motion, will permit the obtaining of any velocity ratio between the two motions.

Another object of my invention is to devise a grid winding machine which may be adjusted so as to produce a wound grid having any desired pitch between the grid turns.

Still another object of my invention is to devise a grid winding machine capable of winding a grid electrode having a variable pitch helix.

A further object of my invention is to provide a mechanism which when applied to a screw cutting lathe will permit the cutting of screws or worms having any pitch and in accordance with any standard.

Other objects and applications of my invention will be appreciated from a consideration of the following, detailed description taken in conjunction with the accompanying drawings in which Fig. 1 is a front elevation of a grid winding machine showing the essential elements constituting my invention.

Fig. 2 is an end view of the machine showing change gearing by which relatively large changes may be made in the relative motion between the machine spindle and lead screw.

Fig. 3 is a sectional view of that element of my machine known as the mandrel headstock on line 3—3 of Fig. 4.

Fig. 4 is an end elevational view of the mandrel headstock.

Figs. 10 and 11 show in side and plan elevation respectively, the reel mechanism which holds and feeds the helix wire to the grid mandrel.

Figs. 12 and 13 are sectional and end elevational views of the mandrel tailstock respectively.

Fig. 14 is a sectional view of gearing for driving the inclined lead screw.

Fig. 15 shows an arrangement for setting and clamping the inclined lead screw.

Figs. 16 and 17 show two sectional views of a half nut and locking arrangement connected with the carriage of the machine.

Fig. 19 shows how one of the machine elements could be formed so as to wind a grid having a variable pitch.

Figure 7:
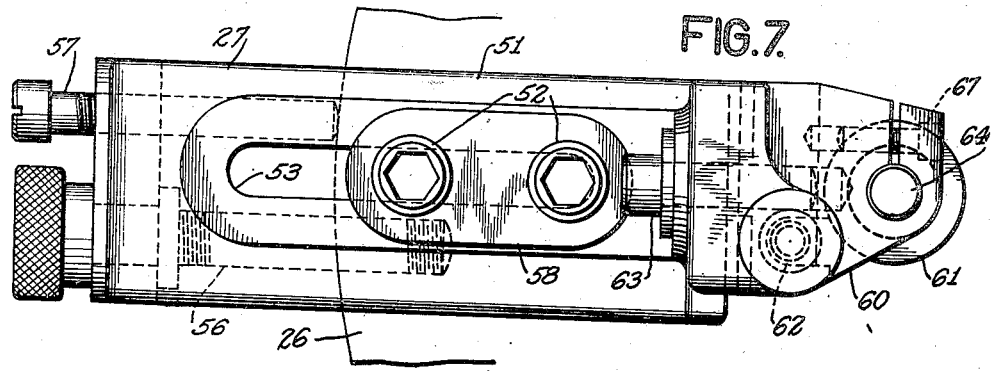
Figs. 7 and 8 show in plan and side elevation, respectively, a mechanism for notching or swaging the grid support bars on which the helix is wound.

The particular kind of grid electrode which the machine of my invention is designed to fabricate is known as a wound grid in which the helix wire is swaged into notches that have been formed in the grid support bars. This type of construction is usually employed for grid electrodes associated with high power tubes. With smaller grids the helix wire is in general welded to the grid support wires.

Referring to Fig. 1, the bed of the grid winding machine is represented by the numeral 1. Mounted on one end of the bed is the headstock 2 which carries the spindle 3 and four step cone pulley assembly 4. The cone pulley together with the back gearing (enclosed in housing 5) provides for eight spindle speeds. A detailed showing and description of the headstock assembly is not included in this specification since the construction is well known and forms no part of the present invention.

Fastened to the spindle 3 is a clutch plate 6, the latter forming part of a pin clutch mechanism 7 which serves to engage and disengage a driving bar 8 at predetermined periods during the operation of the machine. The pin clutch is operated by solenoid 9 with spring return 10. The pin clutch is not described in detail since it forms no part of my invention. The manner in which it functions in connection with other elements of the machine will be described later in the specification.

The driving bar 8 is journaled between bearings in the mandrel head stock 11 and the tail bracket 12. The detailed construction of the mandrel head stock 11 is shown in Figs. 3 and 4, Fig. 3 being a view taken through the vertical section 3—3 of Fig. 4. In these figures 13 represents the mandrel headstock housing which is bolted to the bed of the machine. It consists of a suitable casting for enclosing a chain of gears extending from gear 14, which is keyed to the driving bar 8, through idler gear 15 to gear 16, the latter being integral with a spindle 17. Gears 14 and 16 have the same number of teeth and rotate in the same direction at unity ratio. Spindle 17 is journaled in bearings 18 and 19 while thrust is taken by the ball bearing 20. The driving bar 8 which as above mentioned is keyed to gear 14 is constrained against traverse motion by thrust washers and collars, the latter being pinned to the bar. In Figs. 1 and 3 the thrust washers are parts 21 and 22 and the collars are 23 and the pin clutch mechanism 7. The cover plate 24 for the mandrel headstock housing is fastened to the housing by ten screws indicated by the dotted circles 25 in Fig. 4.

A mandrel holder 28 is keyed and rigidly locked within the spindle 17. The key is shown at 29 and the locking nut at 30, the latter together with the flange 31 on the opposite end of the mandrel bearing against the ends of the spindle 17. The mandrel holder has eight lengthwise grooves 32–39, cut to a depth such that they extend below the surface of the mandrel which is fastened to the end of the holder. Within these grooves are placed the grid support bars around which the helix is to be wound. Keyway 40 is also cut across the face of the mandrel holder. This keyway acts as a guide to line up the mandrel and mandrel holder to prevent relative rotation. Pins 41, pressed into the mandrel holder and extending within the mandrel when it is in position serve to prevent lateral motion of the mandrel. The mandrel is held to the mandrel holder by a bolt which extends completely through the center of the holder and screws into the mandrel.

Figure 5:
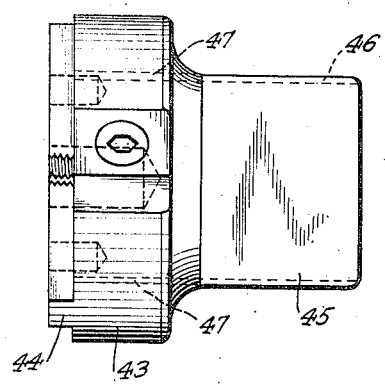
Figs. 5 and 6 show a side and end elevation respectively of the mandrel on which the grid is formed.
Figure 6:
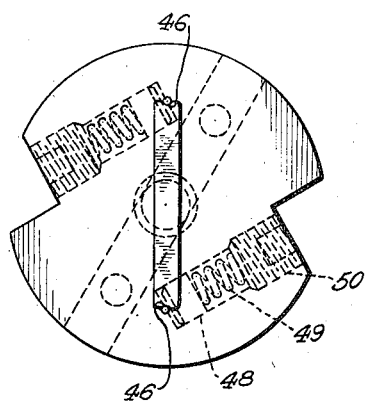
Figure 20:
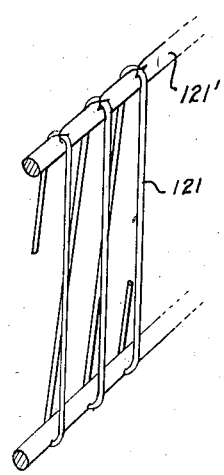
Fig. 20 is a perspective view of a grid of the type made on the machine illustrated.

The mandrel itself, shown in Figs. 5 and 6, consists of a flange 43 having an integral key 44 extending from one face and a grid forming surface 45 extending from the other face. The key 44 mates with the keyway 40 as described above. The grid forming surface 45 has a contour corresponding to the inside dimensions of the grid electrode which is to be constructed. The surface may be round or flat or any other desired shape. Figs. 5 and 6 show a flat surface for forming a flat grid electrode. Both ends of the surface have grooves 46 extending along their entire length and continue as holes 47 through the flange 43 where they register with an oppositely disposed pair of grooves, for example 34 and 38, in the mandrel holder 28. The grid support bars extend through the holes 47 and lay in the grooves 46 where they are notched and swaged as will hereinafter be described. As the machine operates these bars are pulled through the holes and along the grooves, and in order exert a small amount of friction against their motion a unit consisting of a button 48, a spring 49, and an adjusting screw 50 is assembled within the flange 43. The pressure of the button 48 against the grid support bar supplies the required friction.

Figure 8:
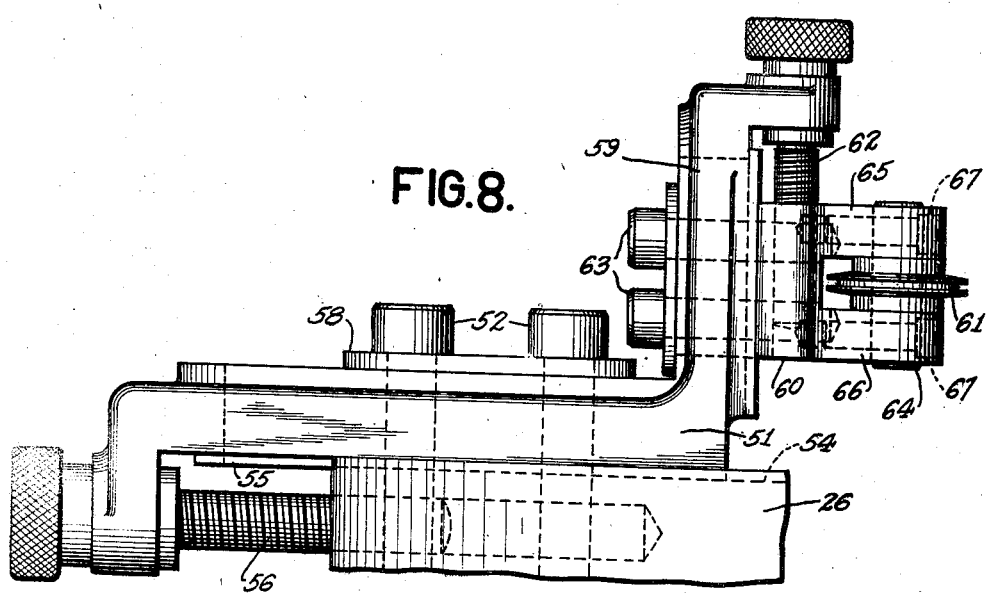

Returning now to Fig. 4, the flange 26, integral with the mandrel headstock, supports a plurality of units 27 for notching and swaging the grid support bars, and for holding the reel containing the helix wire. Only one unit is shown so as not to unnecessarily complicate the figure. In the construction of the larger grids which usually require extra large supporting bars, a unit containing a rotating metal saw may be substituted for the notching unit. The details of a notching or swaging unit are shown in Figs. 7 and 8. In these figures, a Z-shaped bracket 51 is held in position against flange 26 by screws 52 passing through a slot 53 in the bracket. Element 58 is a double washer. A groove 54 in the flange mates with a guide 55 on the bracket for giving alignment and rigidity to the construction. The desired radial position of the bracket with respect to the flange 26 is obtained by means of the screw 56. Any back-lash or lost motion in screw 56 is taken up by the locking screw 57 which bears against the periphery of the flange 26.

Figure 9:
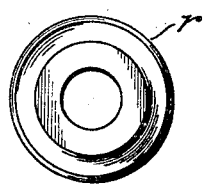
Figs. 9 and 9A are respectively side and end elevational views of the hardened roller for forming notches in a grid support.
Figure 9A:
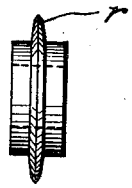

A portion 59 of the bracket 51 extends normal to the face of the flange 26 and mounts an adjustable holder 60 for the notching or swaging roller 61. The figure illustrates a swaging roller. A notching roller is illustrated in Figs. 9 and 9A, this roller having an annular sharpened edge flange 61 as shown. Screw 62 adjusts the roller 61 to the desired distance from the face of the flange 26, or more accurately, to the desired point in relation to the edge of the grid forming surface 45 of the mandrel shown in Fig. 5. Screws 63 clamp the holder rigidly in place after the adjustment has been made. The roller 61 is journaled on pin 64, the latter being clamped between the two arms 65 and 66 of the holder 60 by the screws 67.

Figs. 10 and 11 show a side and end elevation of the reel containing the helix wire together with tensioning means for keeping the wire taut as it unreels and is fastened to the grid support bars during the operation of the machine. The supporting member 118 is Z-shaped and is fastened to the flange 26 by screws 119 and 120 in the flange groove 54', the upper right-hand groove of Fig. 4. As the helix wire 121 is pulled from the reel 122 by the rotation of the grid mandrel it passes over pulleys 123 and 124. Pulley 124 is fixed in position adjacent the mandrel while pulley 123 is fastened to the end of a tensioning lever 125, the latter holding the helix wire taut through the agency of spring 126. Pulley 124 is adjustable in order that it may be made to line up with the notching and swaging units.

The construction of the tailstock is shown in Figs. 12 and 13. Fig. 12 is a view taken thru the vertical section 12—12 of Fig. 13. In these figures, 127 and 128 form the main housing and cover plate respectively for the tailstock mechanism. The tailstock unit is mounted on the carriage 95 and moves transversely with the latter during the operation of the machine. The housing encloses a train of gears extending from gear 129, through idler gear 130 to gear 131 which is integral with the spindle 132. The gear trains in the headstock and tailstock are so chosen that the headstock spindle and the tailstock spindle have the same angular motion.

Gear 129 is splined to the driving shaft 8 by the spline 133. Spindle 132 is journaled in bearings 134 and 135 and end thrust is taken by the ball bearing 136. A hand wheel 137 is keyed to a shaft extension of the spindle. This hand wheel permits the hand operation of the entire machine while setting up the work prior to automatic operation.

A tail mandrel 138 having a tapered shank 139 fits into a tapered hole in the tailstock spindle and is held in place by a screw 140 which passes thru the hand wheel and screws into a tapped hole in the end of the tapered shank. The tail mandrel illustrated in Fig. 12 is designed to cooperate with a headstock mandrel for winding a flat grid electrode. The tail mandrel is divided into two parts, the main part being integral with the tapered shank and the other part or segment 141 being fastened to the main part by screws 142. Between the parts are clamped the ends of the two support bars of the grid electrode which is to be formed. The clamping surfaces are serrated for giving a firmer grip on the support bars. During the operation of the machine the tail mandrel pulls the grid support bars thru the head stock mandrel at such a rate that for one revolution of the mandrels the advance equals the desired pitch of the grid helix wires.

Returning now to Figs. 1 and 2, gear 68, mounted on the end of spindle 3, drives the screw gear 69 thru a gear train composed of reversing gears 70 and 71, stud gear 72, and idler gear 73. The gears 69 and 73 are change gears and are so chosen that the screw gear 69 makes a predetermined number of revolutions for one revolution of the gear 68 or the stud gear 72, the latter two usually having the same number of teeth. In Fig. 2 the change gearing is known as simple gearing as is well known in the machine tool art. Reverse lever 74 is pivoted about the axis of gear 72 and when thrown to the upper position causes the disengagement of gears 68 and 70 and brings into mesh the gears 68 and 71. This causes a reversal in the direction of rotation of the screw gear relative to the spindle. The back gearing is shown at 5' but will not be described in detail since its construction is well known in the art.

The screw gear 69 is keyed to the shaft 75, the latter being journaled between bearings in block 76 and the feed gear bearing block 77 which are fastened to the bed of the machine.

One of the distinguishing features of the invention will now be described. It consists in mounting the lead screw 78 in a manner such that it may be inclined at an angle to the horizontal or broadly, at an angle to the transverse motion of the carriage 95.

Fig. 14 is a view taken through the section 14—14 of Fig. 1. The figure shows a preferred arrangement of parts which permits the rotary motion of shaft 75 to be transferred to the lead screw 78 while the latter assumes any angle between 0° and a predetermined angle with the horizontal. Fig. 1 shows the maximum value of this angle to be 30° but this value is illustrative only and is in no way to be considered as limiting. In Fig. 14, the bearing block 77 comprises two bearings 79 and 79' at right angles to each other. The bearing 79 journals one end of shaft 75 as mentioned above and the other bearing 79' journals shaft 80. An outboard bearing 81 also journals shaft 80. The shaft 80 is also journaled in yoke member 82 while the latter serves to journal one end of the lead screw 78. Mounted in operative relationship on shaft 75, shaft 80, and lead screw 78 are three spiral miter gears 83, 84, and 85, respectively, the gear 84 serving as an idler between the other two and also permitting the lead screw 78 to be angularly displaced with respect to shaft 75 while maintaining a direct power drive therebetween. Suitable thrust bearings 86 and collars 87 are mounted on the various shafts to constrain the gears to positions for quiet and efficient operation.

Fig. 15 is a sectional plan view of the far end of the lead screw together with a clamping device which is constrained to move in an arcuate slot 88 in member 89. Referring to Figs. 1 and 15, the bearing 90 journals the shaft extension 91 of the lead screw 78. The bearing 90 may be securely clamped by screws 92 and 93 at any position on the member 89 depending on the angle which the lead screw makes with the horizontal. The distance between the end of the threads of the lead screw 78 and the collar 94 is somewhat greater than the length of the half nut 110, Fig. 17. This prevents the mechanism of Fig. 17 from jamming against the clamping arrangement of Fig. 15 since the half nut disengages the lead screw.

Again referring to Fig. 1, 95 is a carriage which moves transversely along the ways 100 of the bed 1. Attached to the apron 101 of the carriage and forming a part thereof is an extension 102 having a vertical slot 103. Constrained to move along this slot is the mechanism shown by the two sectional views of Figs. 16 and 17. Fig. 16 is a view through section 16—16 of Fig. 1 and Fig. 17 is a view through section 17—17 of the same figure. Both Figs. 16 and 17 assume the lead screw to be in a horizontal rather than in an inclined position.

Referring to Figs. 16 and 17, parts 104 and 105 when fastened together on opposite sides of the member 102 constitute a retaining unit for other parts of the mechanism. The surfaces 107 on parts 104 and 105 form a sliding fit with similar surfaces of member 102. Journaled in part 104 is the part 108 which is held in place by the nut 109. Half nut 110, the compression spring 111, and the cam follower 112 are assembled with the part 108 and held together by the pin 113. The spring holds the half nut in a retracted or disengaged position relative to the lead screw 78. The cam 114, which is operated by the handle 115, controls the position of the half nut. In the position shown in the figures the spring has forced the half-nut to its greatest retracted position. With the cam in the position shown by the dotted line 116, Fig. 17, the half-nut has been forced into engagement with the lead-screw. The bored extension 117 of the part 108 slides over the lead-screw and functions as a guide to always maintain the half-nut in a position to easily engage the lead-screw regardless of the angle which the latter may take.

It will now be seen that during rotation of the lead screw and with half nut engaged therewith, the mechanism follows the advance of the screw. In so doing the carriage together with the tail stock travels along the ways a distance equal to the travel of the half nut multiplied by the cosine of the angle between the lead screw and the horizontal. In design of the grid winding machine the maximum angle was chosen as 30°. Therefore, the travel of the carriage can be made equal to that of the half nut multiplied by any value between 1 and 0.866, the cosine of 30°.

As an example, let it be assumed that one wishes to wind a grid having 9¼ turns per inch which equals a pitch of 0.1081 inch. We will also assume that the lead screw has 8 turns per inch, a value which is in common use. Now it is obvious that any number of grid turns per inch in excess of 8 (the pitch of the lead screw) requires a choice of change gears (see Fig. 2) which will produce a step-down ratio between the revolutions of the spindle and those of the lead screw per unit time. On the other hand any number of turns per inch less than 8 requires a step-up gear ratio. Referring to Figs. 2, it is assumed that the stud gear 72 revolves at the same rate as the spindle 3 (which is the usual practice) and that the stud gear has 32 teeth. Employing a 36 tooth screw gear and simple gearing, the advance of the lead screw for one turn of the spindle would be $$\frac{32}{36} \times \frac{1}{8} = \frac{1}{9} \text{ or } 0.1111 \text{ inch}$$

$$\frac{0.1081}{0.1111} = 0.973$$

which is the cosine of 13° 21'. The lead screw would therefore be set at an angle of 13° 21' to give the desired 9¼ turns per inch winding on the grid.

As another example and one in which the invention is applied to a screw cutting lathe, let it be assumed that one wishes to cut a 24 pitch worm. This is equivalent to a lead of $\pi \div 24$ or 0.1309 inch. In this example the lead screw must rotate at a greater rate than the spindle. Again assuming a 32 tooth stud gear and employing a 28 screw gear and a single idler gear as in simple gearing, the advance of the lead screw for one turn of the spindle would be $$\frac{32}{28} \times \frac{1}{8} = \frac{1}{7} \text{ or } 0.1429 \text{ inch}$$

$$\frac{0.1309}{0.1429} = 0.9160$$

which is the cosine of 23° 39'. The lead screw would therefore be set at an angle of 23° 39' to give the required transverse carriage feed for turning a 24 pitch worm.

It will of course be appreciated that different choices of change gearing will result in different angles to which the lead screw should be set for any desired pitch and that the choice resulting in the smallest angle will be the most desirable.

When the half nut 110 is disengaged from the lead screw 78, operating the handle 144 moves the carriage along the ways 100 in accordance with common practice as employed in machine tool design.

Figure 18:
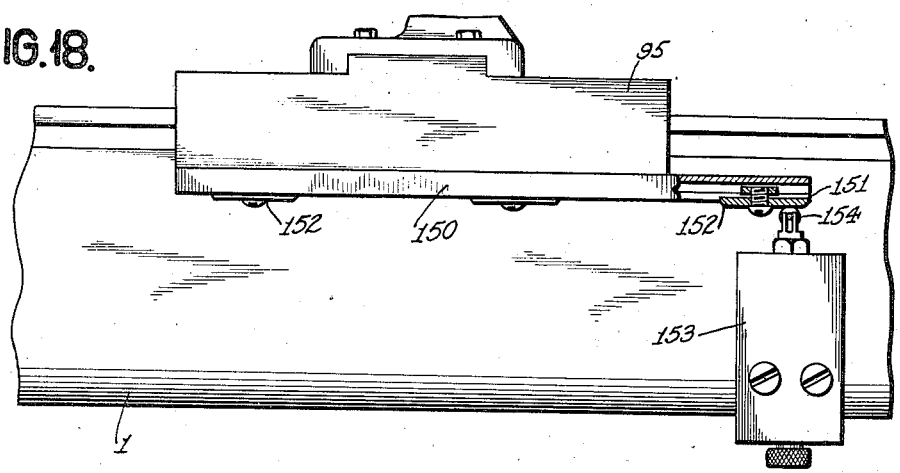
Fig. 18 shows a contact making arrangement for automatically starting and stopping the rotation of the grid mandrels.

Fig. 18 shows a mechanism for automatically stopping the rotation of the grid mandrels while the traverse motion of the carriage and tailstock continues. A device of this kind is desirable when a number of short grid electrodes are to be made for one complete traverse motion of the carriage, since it is undesirable to continue mounting the helix wire on the grid support bars between the individual grids. The individual grids may be suitably separated after a plurality have been wound. Referring to Fig. 18, a grooved member 150 is fastened to the back of the carriage 95. Within the groove 151 a plurality of cams 152 are spaced, said spacing depending on the length of the grids which are to be made. A contact making device 153 is mounted on the bed 1 of the machine in operative relationship to the cams 152, and as the carriage moves along the ways, the roller or cam follower 154 is forced downward by the leading edge of the cams thereby closing a contact within the device 153 and completing an electrical circuit. The circuit is closed through the solenoid 9 of the pin clutch mechanism 7. The operation of the solenoid disengages the clutch and stops the rotation of the shaft 8 and consequently all rotary motion within the head and tailstocks. When the following edge of the cams leave the roller 154 the electrical circuit is broken, the pin clutch again engages, and the rotation of the mandrels continues. It will be seen that the length of the cams 152 equals the distance between the grids.

The operation of the grid machine will now be described. A suitable mandrel corresponding to the type of grid which is to be wound, such as, for example, that shown in Fig. 5, is fastened in place on the mandrel holder shown in Fig. 3. Two grid support wires are threaded through slots 34 and 38 of the mandrel holder, see Fig. 4, and extended through the holes 47 and the grooves 46 of the mandrel and then caught between the jaws of the tailstock mandrel 138, see Fig. 12. At the beginning of the winding operation the tailstock mandrel 138 may be almost in contact with the headstock mandrel. A notching device with a roller $r$ as shown in Fig. 9 is placed in the upper left hand slot 54 of the head stock, see Fig. 4. A swaging device, see Figs. 7 and 8, is positioned as shown in Fig. 4 and another similar swaging device is positioned in the lower left hand groove 54, also shown on Fig. 4. The helix wire is wound on a reel, see Fig. 10, and positioned in the upper right hand groove 54' shown in Fig. 4.

The proper change gears are selected for the change gears combination, see Fig. 2, such as, for example, those given in the above illustration wherein a grid of 9¼ turns per inch is to be made. The lead screw is set at an angle of 13° 21' and securely clamped in position.

The cam 152 shown on the extreme left in Fig. 18 is positioned so that its leading edge will operate the contact mechanism 153 through the cam follower 154 after the desired length of the first grid has been formed. A second cam is then positioned so that its leading edge is spaced a distance from the following edge of the first cam equal to the length of helix wire to be wound on the second grid. A third cam is positioned so that its leading edge is similarly spaced from the following edge of the second cam, etc.

The machine is then operated by the hand wheel on the tailstock until the first turn or so of the helix wire is securely fastened to the grid support bars. The machine is then started and from then on the grids are automatically wound.

It will be obvious to those skilled in the art that various modifications of my invention may be made without departing from the fundamental principle of operation. For example, one such modification would be the substitution of a curved slot for the straight slot 103 in member 102 of Fig. 1. The curved slot could be constructed so that a grid having a variable pitch winding would be formed, grids of this type being employed in so-called variable mu tubes of the remote cut-off type. A slot for this type of grid would take the approximate form shown at 103' in Fig. 19. This would result in a grid having its end turns more closely spaced than the central turns. The slot in Fig. 19 would permit only one grid at a time being formed but it would be merely a matter of design to form a slot capable of forming a plurality of grids.

Another modification would be the provision of means whereby the member 102 of Fig. 1 may be inclined at an angle with the vertical.

Having thus described my invention, I claim:

1. In a machine of the class described, the combination of a headstock and tailstock having a work-piece mounted thereon, means for producing relative rectilinear travel between said headstock and tailstock to vary the distance therebetween as a fabricating operation is performed on said work-piece, said means including an actuating element disposed at an angle to the line of said relative rectilinear travel, and means for varying said angle to produce corresponding variation in the rate of said relative rectilinear travel.

2. A machine as defined in claim 1, wherein the actuating element is a lead screw having motion translating connection with said tailstock, said machine further including means for rotating said lead screw.

3. A machine as defined in claim 1, wherein the actuating element is a lead screw having motion translating connection with said tailstock, said machine further including means for rotating said lead screw, the said rotating means also being operable to rotate said work-piece.

4. A machine as defined in claim 1, wherein the work-piece is a wire, and said headstock and tailstock co-operate to form said wire into a predetermined shape.

5. A machine as defined in claim 1, wherein the work-piece is a wire, and the machine further includes a plurality of support bars co-operating with said head and tailstocks to form said wire into a predetermined shape.

6. A machine as defined in claim 1, wherein the angle varying means includes a member operable to set said actuating element in any one of an infinite number of different angular relationships to said line of travel, within a predetermined maximum angle.

7. A machine as defined in claim 1, wherein the actuating element is a lead screw, and wherein the machine further includes means for rotating said screw, and a slotted element co-operating with said screw to convert the rotation of said screw into rectilinear travel of said tailstock at a rate dependent upon the setting of said angle varying means.

8. A machine as defined in claim 1, wherein the work-piece is a wire, and the machine further includes a plurality of support bars co-operating with said head and tailstocks to form said wire into a predetermined shape, and means for stopping the operation when formation of the wire to said shape has been completed.

9. A machine as defined in claim 1, wherein the work-piece is a wire, and the machine further includes a plurality of support bars co-operating with said head and tailstocks to form said wire into a predetermined shape, and electrically operated means for stopping the operation when formation of the wire to said shape has been completed.

10. In a machine as defined in claim 1, means including a rotatable coupling for causing said head and tailstocks to operate upon said work-piece, and means in the path of said relative rectilinear travel to cause release of said coupling when the operation on the work-piece is completed.

11. In a machine as defined in claim 1, means including a rotatable coupling for causing said head and tailstocks to operate upon said work-piece, and electrical means in the path of said relative rectilinear travel to cause release of said coupling when the operation on the work-piece is completed.

12. A machine as defined in claim 1, wherein the work-piece includes a plurality of parallel wires, and wherein the machine further includes a plurality of support bars co-operating with said head and tailstocks to produce concurrent axial and rotary movements of said wires to form them into pre-determined shapes.

VICTOR H. VAN SANT.

REFERENCES CITED

The following references are of record in the file of this patent:

UNITED STATES PATENTS

| Number | Name | Date |
|---|---|---|
| 172,679 | Williamson | Jan. 25, 1876 |
| 2,181,288 | Washburn | Nov. 28, 1939 |
| 1,835,114 | Kirby | Dec. 8, 1931 |
| 2,169,351 | Bednarek | Aug. 15, 1939 |
| 650,213 | Ackles | May 22, 1900 |
| 260,658 | Carter | July 4, 1882 |
| 1,269,489 | Murphy | June 11, 1918 |
| 2,118,489 | Carter | May 24, 1938 |
| 2,225,913 | Lange et al. | Dec. 24, 1940 |
| 1,827,056 | Williams | Oct. 13, 1931 |
| 1,585,905 | Madden et al. | May 25, 1926 |

FOREIGN PATENTS

| Number | Country | Date |
|---|---|---|
| 38,198 | Germany | Jan. 8, 1887 |
| 491,652 | France | Feb. 11, 1919 |